United States Patent [19]
Kaneko

[11] Patent Number: 5,964,968
[45] Date of Patent: *Oct. 12, 1999

[54] RARE EARTH METAL-NICKEL HYDROGEN STORAGE ALLOY, METHOD FOR PRODUCING THE SAME, AND ANODE FOR NICKEL-HYDROGEN RECHARGEABLE BATTERY

[75] Inventor: Akihito Kaneko, Kobe, Japan

[73] Assignee: Santoku Metal Industry Co., Ltd, Hyogo-Ken, Japan

[*] Notice: This patent is subject to a terminal disclaimer.

[21] Appl. No.: 08/836,902

[22] PCT Filed: Aug. 28, 1996

[86] PCT No.: PCT/JP96/02400

§ 371 Date: Apr. 25, 1997

§ 102(e) Date: Apr. 25, 1997

[87] PCT Pub. No.: WO97/08353

PCT Pub. Date: Mar. 6, 1997

[30] Foreign Application Priority Data

Aug. 31, 1995 [JP] Japan .................................. 7-245166

[51] Int. Cl.⁶ ..................................................... H01M 4/02
[52] U.S. Cl. .......................... 148/555; 75/255; 164/463; 164/479; 429/218.2
[58] Field of Search ..................................... 148/555, 556, 148/538, 561, 409, 410, 419, 427, 426, 428, 442, 463, 429; 429/59, 101, 218, 222, 223, 224, 218.2; 204/293; 164/479, 480, 463

[56] References Cited

U.S. PATENT DOCUMENTS

| | | | |
|---|---|---|---|
| 4,660,622 | 4/1987 | Reutler et al. | 164/479 |
| 5,470,404 | 11/1995 | Yamamoto et al. | 420/900 |
| 5,496,424 | 3/1996 | Fujitani et al. | 420/900 |
| 5,512,385 | 4/1996 | Komori et al. | 429/101 |
| 5,629,000 | 5/1997 | Matsuura et al. | 429/59 |
| 5,654,115 | 8/1997 | Hasebe et al. | 429/59 |
| 5,817,222 | 10/1998 | Kaneko | 148/561 |

*Primary Examiner*—Melvyn Andrews
*Attorney, Agent, or Firm*—Darby & Darby

[57] ABSTRACT

A rare earth metal-nickel hydrogen storage alloy having a composition represented by the formula (1)

$$(R_{1-x}L_x)(Ni_{1-y}M_y)_z \qquad (1)$$

(R: La, Ce, Pr, Nd; L: Gd, Tb, Dy, Ho, Er, Tm, Yb, Lu, Y, Sc, Mg, Ca; M: Co, Al, Mn, Fe, Cu, Zr, Ti, Mo, Si, V, Cr, Nb, Hf, Ta, W, B, C; $0.01 \leq x \leq 0.1$; $0 \leq y \leq 0.5$; $4.5 \leq z \leq 5.0$), the alloy including in an amount of not less than 10 volume % and less than 95 volume % thereof crystals each containing not less than 2 and less than 20 antiphase boundaries extending perpendicular to C-axis of a crystal grain of the alloy per 20 nm along the C-axis, not less than 60% and less than 95% of added amount of said element represented by L in the formula (1) being arranged in antiphase areas, a method for producing the same, and an anode for a nickel-hydrogen rechargeable battery. The anode for a nickel-hydrogen rechargeable battery can improve initial activity, battery capacity, and battery life all at the same time.

9 Claims, 1 Drawing Sheet

4 μm

4 μm

RARE EARTH METAL-NICKEL HYDROGEN STORAGE ALLOY, METHOD FOR PRODUCING THE SAME, AND ANODE FOR NICKEL-HYDROGEN RECHARGEABLE BATTERY

FIELD OF ART

The present invention relates to a rare earth metal-nickel hydrogen storage alloy exhibiting high capacity and long life when it is used as a hydrogen storage vessel, a heat pump, or an anode material for a nickel-hydrogen rechargeable battery, a method for producing the same, and an anode for a nickel-hydrogen rechargeable battery.

An alloy used for an anode of a nickel-hydrogen rechargeable battery which is currently produced in a large amount is mainly an $AB_5$ type alloy containing light rare earth elements such as La, Ce, Pr, Nd, or mixtures thereof, or Mm (misch metal) in A site, and Ni, Co, Mn, and/or Al in B site thereof. This alloy has larger hydrogen storage capacity than other alloy, and a usable hydrogen absorption-desorption pressure of 1 to 5 atm. at an ordinary temperature.

A conventional rare earth metal-nickel alloy of the $AB_5$ type structure, however, exhibits low initial activity in absorbing hydrogen, so that several to a dozen of cycles of hydrogen absorption and desorption are required at the initial stage in order to achieve 100% hydrogen storage capacity. Further, this alloy expands and contracts upon absorbing and desorbing hydrogen, thereby generating cracks and being decrepitated to deteriorate the properties of the battery.

There has been a recent demand for an electrode exhibiting still higher battery capacity, and an alloy has been developed having a composition wherein the content of transition metals consisting mainly of nickel is decreased relative to that of rare earth metals in order to increase the battery capacity. For example, Japanese Laid-open Patent Application No. 6-145851 discloses a hydrogen storage alloy obtained by rapidly cooling and solidifying an alloy melt composed mainly of La and Ni with the atomic ratio of Ni to La being not higher than 4.9, which alloy is finely crystallized to have alloy crystals having the length along the short axis of not more than 10 $\mu$m. This publication also discloses that capacity and life of a nickel-hydrogen rechargeable battery can be improved by utilizing this hydrogen storage alloy.

This hydrogen storage alloy exhibits the effects expected from its finely crystallized structure, but does not achieve as much increase in battery capacity as is expected theoretically, in spite of its composition rich in rare earths wherein the content of Ni is decreased from the composition of $LaNi_5$ type. It is believed that this is because in the composition rich in La, which has particularly strong affinity to hydrogen among other rare earth elements, the absorbed hydrogen is trapped, thereby decreasing the substantial capacity which contributes to absorption and desorption of hydrogen. The above referenced publication also discloses that a portion of La may be substituted by other rare earth elements than La, with no specific elements to be employed and no concrete effects resulting therefrom.

As discussed above, a rare earth metal-nickel hydrogen storage alloy for use as an anode material of a nickel-hydrogen rechargeable battery is conventionally expected to have higher capacity and longer life.

In order to prolong life, there are proposed, for example, a method of increasing the content of Co and the like, and a method of subjecting the alloy to a heat treatment to clear compositional segregation for relieving strain occurred in casting, but either with decrease of battery capacity. On the other hand, if the content of Mn is increased to enhance the capacity, prolongation of the life is sacrificed. Accordingly, an alloy has not yet known which satisfies both high initial activity and long life at the same time, and which also achieves high battery capacity when it is used for an anode of a nickel-hydrogen rechargeable battery.

As discussed above, discussion on the conventional nickel-hydrogen rechargeable battery of the $AB_5$ type structure has mainly been focused on its composition. However, properties of an alloy also depend on a crystal state and crystal distribution from more detailed point of view. Therefore, effects of such crystal state or the like on the properties of an alloy have recently been attracting attention.

It is hitherto been known that an alloy having $Ce_2Ni_7$ or $CeNi_3$ structure contains antiphase boundaries. The antiphase boundary is a boundary face between a normal phase and an antiphase in an antiphase area wherein the arrangement of atoms on a sublattice is inverted, in a superlattice structure with incomplete regularity in the arrangement of the component atoms (*Dictionary of Physics*, small edition, published by Kabushiki Kaisha Baifukan, Oct. 20, 1986, pp.439–440).

However, it is not known that such antiphase boundaries exist in $LaNi_5$ type structure, nor is known the effects of the antiphase boundaries. Therefore, it is not at all known conventionally to apply this structure for improving the properties of a hydrogen storage alloy.

As a method for producing a rare earth metal-containing alloy, there is known a method utilizing a roll casting device having a single roll or double rolls, onto the surface of which a rare earth metal-containing alloy melt is supplied, and rapidly quenched at the controlled cooling rate. In a generally used roll casting device, which may be used for producing an amorphous material or the like, the roll surface merely has the surface roughness of several micrometers or less in ten-point mean roughness (Rz), or the roll surface is almost a mirror surface.

DISCLOSURE OF THE INVENTION

It is an object of the present invention to provide a rare earth metal-nickel hydrogen storage alloy and a method for producing the same which can improve the initial activity, the battery capacity, and the battery life all at the same time, as compared to the conventional rare earth metal-nickel hydrogen storage alloy which can be used as an anode material for a nickel-hydrogen rechargeable battery.

It is another object of the present invention to provide an anode for a nickel-hydrogen rechargeable battery which achieves the high initial activity, the high battery capacity, and the long battery life all at the same time.

The present inventor has reached the present invention by paying the attention to the following points in relation to the facts that an alloy having a composition with decreased content of transition metals mainly containing nickel relative to the rare earth metals (referred to as "R-rich composition" hereinbelow) has larger hydrogen storage capacity than the $AB_5$ type alloy, but the practical hydrogen-storage capacity thereof is lower than the $AB_5$ type alloy because a binding force between the alloy and hydrogen in absorbing hydrogen is too strong, which leads to rise in hydrogen desorbing temperature.

First, the present inventor has found that, by generating a particular amount of crystals containing antiphase boundaries therein in a particular distribution in an alloy with R-rich composition, initial activity for hydrogen absorption and desorption is improved, and that presence of such antiphase boundaries favorably affects prevention of decrepitation due to absorption and desorption of hydrogen. It is believed that the presence of such antiphase boundaries favorably affects the hydrogen storage properties because rare earth elements are arranged along the antiphase boundaries, through which hydrogen can easily be transferred.

Second, the introduction of the antiphase boundaries causes disadvantages in the battery life since the antiphase area has high density of rare earth elements, resulting in inferior corrosion resistance against a electrolytic solution. In the light of this disadvantage, the present inventor substituted a portion of the light rare earth elements employed in the A-site by a particular elements including heavy rare earth elements (referred to as "substitution element L" hereinbelow) to arrange a large amount of the substitution element L in the antiphase area, thereby improving the battery life.

Third, the present inventor has found that the alloy having crystals of the $LaNi_5$ type single-phase structure containing the particular antiphase boundaries as described above can be obtained by supplying an alloy melt of a particular composition onto a roll of a particular surface roughness under particular cooling conditions to cast into an alloy of a particular thickness.

According to the present invention, there is provided a rare earth metal-nickel hydrogen storage alloy (referred to as "hydrogen storage alloy B" hereinbelow) having a composition (referred to as "composition A" hereinbelow) represented by the formula (1)

$$(R_{1-x}L_x)(Ni_{1-y}M_y)_z \qquad (1)$$

wherein R stands for La, Ce, Pr, Nd, or mixtures thereof, L stands for Gd, Tb, Dy, Ho, Er, Tm, Yb, Lu, Y, Sc, Mg, Ca, or mixtures thereof, M stands for Co, Al, Mn, Fe, Cu, Zr, Ti, Mo, Si, V, Cr, Nb, Hf, Ta, W, B, C, or mixtures thereof, x, y and z satisfy the formulae of $0.01 \leq x \leq 0.1$, $0 \leq y \leq 0.5$, and $4.5 \leq z \leq 5.0$, respectively, crystals in said alloy being of a $LaNi_5$ type single phase structure, said alloy including in an amount of not less than 10 volume % and less than 95 volume % thereof crystals each containing not less than 2 and less than 20 antiphase boundaries extending perpendicular to C-axis of a crystal grain of the alloy per 20 nm along the C-axis, not less than 60% and less than 95% of added amount of said element represented by L in the formula (1) being arranged in antiphase areas.

According to the present invention, there is provided a method for producing the hydrogen storage alloy B comprising the steps of uniformly solidifying an alloy melt having the composition A represented by the formula (1) above to have a thickness of 0.1 to 2.0 mm under cooling conditions wherein a supercooling degree is 50 to 500° C. and a cooling rate is 1000 to 10000° C./sec. using a roll casting device having a roll with a surface roughness of 30 to 150 μm in ten-point mean roughness (Rz), thereby obtaining an alloy; and heating said alloy in vacuum or an inert atmosphere at 800 to 1000° C. for 0.1 to 12 hours.

According to the present invention, there is further provided an anode for a nickel-hydrogen rechargeable battery containing as an anode material the hydrogen storage alloy B and an electrically conductive material.

BEST MODE FOR CARRYING OUT THE INVENTION

Figure 1:
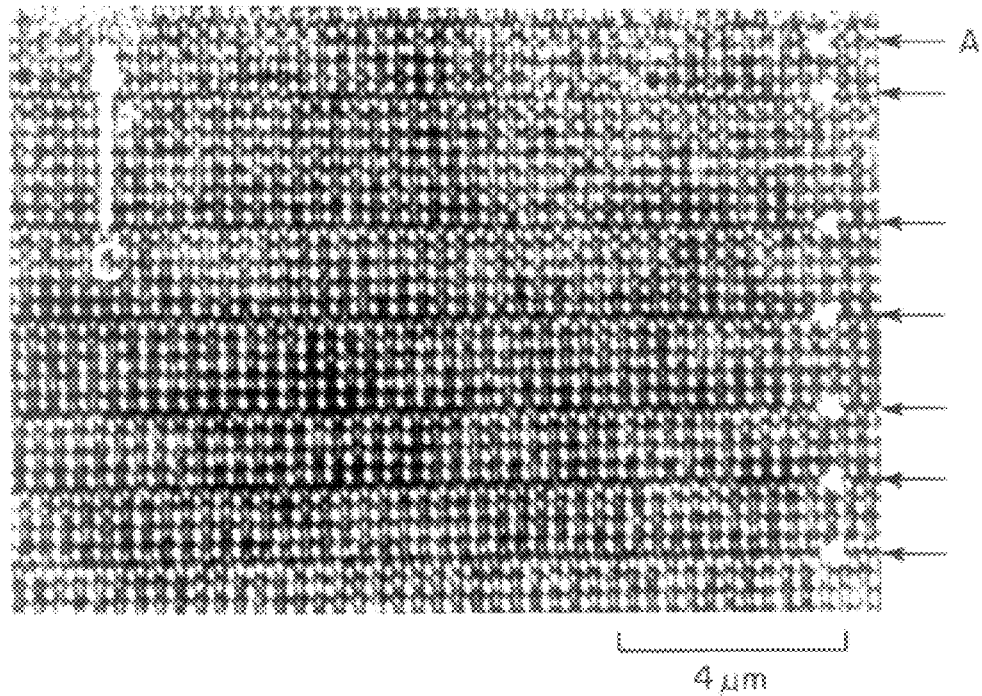
FIG. 1 is a photograph taken by a high-resolution transmission electron microscope for determining the number of the antiphase boundaries contained in the crystal grains in an alloy in the form of ribbons prepared in Example 1.

The hydrogen storage alloy B of the present invention is a rare earth metal-nickel hydrogen storage alloy which has the composition A represented by the formula (1) above, in which crystals have a $LaNi_5$ type single phase structure, which includes in an amount of not less than 10 volume % and less than 95 volume % thereof crystals each containing not less than 2 and less than 20 antiphase boundaries extending perpendicular to C-axis of a crystal grain of the alloy per 20 nm along the C-axis of a crystal grain, and in which not less than 60% and less than 95% of the added amount of the element represented by the substitution element L is arranged in antiphase areas. If the content of the crystals each containing not less than 2 and less than 20 antiphase boundaries extending perpendicular to the C-axis of a grain of the crystal in the alloy per 20 nm along the C-axis is less than 10 volume %, the initial activity is declined, while if it exceeds 95 volume %, the battery life is shortened. If the amount of the substitution element L contained in the antiphase areas is less than 60% of the added amount of the element L, the corrosion resistance of the obtained alloy is not sufficient, thereby being disadvantageous in the battery life, while if it exceeds 95%, the hydrogen storage property is lowered.

The crystal structure of the hydrogen storage alloy B may be identified to be a $LaNi_5$ type single phase structure by forming and analyzing an X-ray diffraction pattern of the powdered alloy using an ordinary X-ray diffraction apparatus. The antiphase boundaries may be determined by introducing electron beam from [100] axis of a crystal grain of the alloy, taking a high resolution image of (100) plane thereof under the magnification of 300000 or more using a high resolution transmission electron microscope with the accelerating voltage of 200 kV or more, and measuring the number of the antiphase boundaries per unit length along the direction of the C-axis (direction of [001]). The content of the crystal grains containing the antiphase boundaries may be determined by taking an image of the (100) plane of a crystal grain by a transmission electron microscope with the accelerating voltage of 200 kV or more under the magnification of 10000to 50000, and measuring the surface ratio of the crystals containing the antiphase boundaries. The amount of the substitution element L substituted in the antiphase areas may be determined by analyzing the composition of the antiphase areas with EDX spectrometer of a field-emission high resolution transmission electron microscope at the beam diameter of 4 nm.

If z in the above formula (1), i.e. the atomic ratio of $(Ni_{1-y}M_y)$ is less than 4.5 when $(R_{1-x}L_x)$ is 1, the $LaNi_5$ type single phase structure is not obtained, and the battery life is shortened, whereas if it exceeds 5.0, the antiphase boundaries are not formed. If y in the formula (1), i.e. the atomic ratio of the substitution element M substituting for Ni exceeds 0.5, the surface activity is lowered, and the hydrogen storage capacity is declined. If x in the formula (1), i.e. the atomic ratio of the substitution element L substituting for R exceeds 0.1, the hydrogen storage capacity is declined, and thus the battery capacity is declined when the alloy is used for an anode for a nickel-hydrogen rechargeable battery.

In the above composition A, R in the formula may be one or more elements selected from the rare earth metals consisting of La, Ce, Pr, and Nd. When two or more elements are combined, the content of each element may suitably be selected so that, preferably, the content of La is 20 to 60 atm. %, Ce is 0 to 60 atm. %, Pr is 0 to 50 atm. %, and Nd is 0 to 50 atm. %. Alternatively, misch metal may be used as the starting material. The substitution element L substituting the rare earth metals R in the formula preferably has similar atomic radius to those of rare earth metals, and positioned at the rare earth metal site as a substitution therefor. The substitution element L is selected from heavy rare earth metals consisting of Gd, Tb, Dy, Ho, Er, Tm, Yb, and Lu, or other metals consisting of Y, Sc, Mg, and Ca. In practice, the element L may be one element or a mixture of more than one element in the hydrogen storage alloy B. Of such substitution element L, an element having large hydrogen storage capacity in itself may preferably be used. In the hydrogen storage alloy B of the present invention, such substitution element L is not present in itself, but is present as a substitution element for the rare earth metal R, because even if element L itself has large hydrogen storage capacity, it may cause rise in hydrogen desorption temperature or decrepitation by hydrogen absorption. Accordingly, in the hydrogen storage alloy B of the present invention, these drawbacks can be remedied by introducing the substitution element L as a substitution for the rare earth metal R, and favorable effects due to the precipitation of the antiphase boundaries can be attained. The content of the substitution element L (represented by x in the formula) is $0.01 \leq x \leq 0.1$, preferably $0.05 \leq x \leq 0.09$.

The metals for M in the above formula may be one element or a combination of two or more elements. The combination of two or more elements may suitably be made depending on the properties of each metal. Specifically, Co has effects of expanding the lattice of crystals to lower the equilibrium pressure of hydrogen, and of preventing decrepitation to improve the battery life. The mixing ratio of Co as represented by y, i.e. the atomic ratio of M when (Ni+M) is 1, is preferably 0.01 to 0.3, more preferably 0.02 to 0.2 in atomic ratio (the mixing ratio of other elements will be described on this basis hereinbelow). Al has effects of expanding the lattice of crystals to lower the equilibrium pressure of hydrogen, and of increasing the hydrogen storage capacity. The mixing ratio of Al is preferably 0.03 to 0.3, more preferably 0.05 to 0.1 in atomic ratio. Mn has effects of expanding the lattice of crystals to lower the equilibrium pressure of hydrogen, and of increasing the hydrogen storage capacity. The mixing ratio of Mn is preferably 0.03 to 0.3, more preferably 0.05 to 0.2 in atomic ratio. Fe has effect of activating the surface of the alloy to accelerate the hydrogen absorption-desorption rate. The mixing ratio of Fe is preferably not more than 0.03, more preferably 0.01 to 0.02 in atomic ratio. Cu has an effect of expanding the lattice of crystals to lower the equilibrium pressure of hydrogen. The mixing ratio of Cu is preferably 0.01 to 0.3, more preferably 0.02 to 0.2 in atomic ratio. Zr has effects of improving the hysteresis properties of PCT curve (hydrogen pressure-composition isotherms), and of improving the battery life by precipitating at the grain boundaries to prevent cracking. The mixing ratio of Zr is preferably not more than 0.1, more preferably 0.01 to 0.03 in atomic ratio. Ti has an effect of improving the hysteresis properties of PCT curve. The mixing ratio of Ti is preferably not more than 0.1, more preferably 0.01 to 0.03 in atomic ratio. Mo has effects of improving the activity, and of accelerating the hydrogen absorption-desorption rate. The mixing ratio of Mo is preferably not more than 0.05, more preferably 0.01 to 0.02 in atomic ratio. Si has an effect of lowering the equilibrium pressure of hydrogen. The mixing ratio of Si is preferably 0.01 to 0.25, more preferably 0.02 to 0.05 in atomic ratio. V has an effect of facilitating formation of the antiphase boundaries. The mixing ratio of V is preferably 0.01 to 0.2, more preferably 0.02 to 0.05 in atomic ratio. Cr has an anti-cracking effect. The mixing ratio of Cr is preferably 0.01 to 0.2, more preferably 0.03 to 0.1 in atomic ratio. Nb has an anti-cracking effect. The mixing ratio of Nb is preferably 0.01 to 0.05, more preferably 0.02 to 0.04 in atomic ratio. Hf has an effect of improving the hysteresis properties. The mixing ratio of Hf is preferably not more than 0.05, more preferably 0.01 to 0.03 in atomic ratio. Ta has an effect of improving the hysteresis properties. The mixing ratio of Ta is preferably 0.01 to 0.05, more preferably 0.02 to 0.03 in atomic ratio. W has effects of improving the activity, and of accelerating the hydrogen absorption-desorption rate. The mixing ratio of W is preferably not more than 0.05, more preferably 0.01 to 0.03 in atomic ratio. B has effects of improving the activity, and of accelerating the hydrogen absorption-desorption rate. The mixing ratio of B is preferably not more than 0.03, more preferably 0.01 to 0.02 in atomic ratio. C has an effect of accelerating the hydrogen absorption-desorption rate. The mixing ratio of C is preferably not more than 0.03, more preferably 0.01 to 0.02 in atomic ratio.

The hydrogen storage alloy B of the present invention may contain impurities which are inevitably contained in each of the starting material of the composition A, or during the manufacturing process of the hydrogen storage alloy B.

Specific examples of the composition A represented by the formula (1) may preferably include the following alloy compositions:

$La_{0.25}Ce_{0.49}Pr_{0.05}Nd_{0.2}Gd_{0.02}Ni_{3.61}Al_{0.2}Co_{0.54}Mn_{0.5}Fe_{0.02}$, $La_{0.24}Ce_{0.48}Pr_{0.05}Nd_{0.19}Gd_{0.04}Ni_{3.51}Al_{0.2}Co_{0.53}Mn_{0.49}Fe_{0.02}$, $La_{0.23}Ce_{0.46}Pr_{0.05}Nd_{0.18}Gd_{0.08}Ni_{3.38}Al_{0.19}Co_{0.5}Mn_{0.47}Fe_{0.02}$, $La_{0.23}Ce_{0.46}Pr_{0.05}Nd_{0.18}Dy_{0.08}Ni_{3.38}Al_{0.19}Co_{0.5}Mn_{0.47}Fe_{0.02}$, $La_{0.23}Ce_{0.46}Pr_{0.05}Nd_{0.18}Er_{0.08}Ni_{3.38}Al_{0.19}Co_{0.5}Mn_{0.47}Fe_{0.02}$, $La_{0.23}Ce_{0.46}Pr_{0.05}Nd_{0.18}Yb_{0.08}Ni_{3.38}Al_{0.19}Co_{0.5}Mn_{0.47}Fe_{0.02}$, $La_{0.23}Ce_{0.46}Pr_{0.05}Nd_{0.18}Y_{0.08}Ni_{3.38}Al_{0.19}Co_{0.5}Mn_{0.47}Fe_{0.02}$, $La_{0.23}Ce_{0.46}Pr_{0.05}Nd_{0.18}Sc_{0.08}Ni_{3.38}Al_{0.19}Co_{0.5}Mn_{0.47}Fe_{0.02}$, $La_{0.23}Ce_{0.46}Pr_{0.05}Nd_{0.18}Mg_{0.08}Ni_{3.38}Al_{0.19}Co_{0.5}Mn_{0.47}Fe_{0.02}$, $La_{0.23}Ce_{0.46}Pr_{0.05}Nd_{0.18}Ca_{0.08}Ni_{3.38}Al_{0.19}Co_{0.5}Mn_{0.47}Fe_{0.02}$, $La_{0.23}Ce_{0.46}Pr_{0.05}Nd_{0.18}Gd_{0.08}Ni_{3.38}Al_{0.19}Co_{0.5}Mn_{0.47}Fe_{0.02}Ti_{0.02}$, $La_{0.23}Ce_{0.46}Pr_{0.05}Nd_{0.18}Gd_{0.08}Ni_{3.38}Al_{0.19}Co_{0.5}Mn_{0.47}Fe_{0.02}Zr_{0.02}$, $La_{0.23}Ce_{0.46}Pr_{0.05}Nd_{0.18}Gd_{0.08}Ni_{3.38}Al_{0.19}Co_{0.5}Mn_{0.47}Fe_{0.02}B_{0.02}$, $La_{0.23}Ce_{0.46}Pr_{0.05}Nd_{0.18}Gd_{0.08}Ni_{3.38}Al_{0.19}Co_{0.5}Mn_{0.47}Fe_{0.02}Mo_{0.02}$, $La_{0.23}Ce_{0.46}Pr_{0.05}Nd_{0.18}Gd_{0.08}Ni_{3.38}Al_{0.19}Co_{0.5}Mn_{0.47}Fe_{0.02}W_{0.02}$, $La_{0.23}Ce_{0.46}Pr_{0.05}Nd_{0.18}Gd_{0.08}Ni_{3.38}Al_{0.19}Co_{0.5}Mn_{0.47}Fe_{0.02}Cu_{0.02}$.

In the present method for producing the hydrogen storage alloy B, a mixture of the starting metal materials mixed to have the composition A is melted, and the obtained alloy melt is uniformly solidified to have a thickness of 0.1 to 2.0 mm under the cooling conditions wherein the supercooling degree is 50 to 500° C. and the cooling rate is 1000 to 10000° C./sec., preferably 3000 to 10000° C./sec. using a roll casting device having a roll with the particular surface roughness.

In this case, the supercooling degree refers to a value of (melting point of the alloy)—(actual temperature of the alloy melt below the melting point). In detail, "supercooling" is a phenomenon wherein an alloy melt is not actually solidified even when it is cooled down to the melting point of the alloy, but when the temperature of the alloy melt is further declined to reach the nucleation temperature, fine solid phases, i.e. crystals are formed in the alloy melt to cause solidification of the alloy melt for the first time. The supercooling degree may be controlled by, for example, controlling the temperature of the alloy melt prepared by using a crucible or the like and suitably adjusting the time and speed for transferring the alloy melt to a single roll for solidification. If the supercooling degree and the cooling rate are outside the above requisite ranges, an alloy having the desired antiphase boundaries precipitated cannot be obtained.

The above mentioned roll casting device has a single roll or double rolls of internally water-cooled type or the like, on the surface of which an alloy melt is cooled and solidified. In the roll casting device, the surface roughness of the roll is defined by the ten-point mean roughness (Rz). In the method of the present invention, the alloy melt is cooled and solidified using a roll having surface roughness of 30 to 150 $\mu$m, preferably 60 to 120 $\mu$m in the ten-point mean roughness (Rz).

The ten-point mean roughness (Rz) is defined in JIS B0601-1994 (corresponding to ISO 468), and is represented by the sum of the average of absolute values of the heights of the highest to the fifth highest peaks of the roughness curve of the roll surface measured vertically from the mean line, and the average of absolute values of the depths of the deepest to the fifth deepest valleys of the roughness curve of the roll surface. The ten-point mean roughness (Rz) may be measured using a commercially available stylus type digital surface roughness measuring device based on the same JIS. The above mentioned surface roughness may be given to a roll by grinding the roll with a grinder having a selected type and a particle size (grade) of abrasive grains used for polishing a roll, a rotary disk, or the like, or by processing the surface of the roll to have irregularities by way of, for example, shot blasting, sand blasting, or the like.

The mechanism has not yet been solved thoroughly of the capability of obtaining the particular antiphase boundaries in the hydrogen storage alloy of the present invention by using a roll casting device having a roll with the controlled surface roughness under the conditions defined in the method of the present invention such as the particular cooling conditions. However, if the ten-point mean roughness (Rz) representing the surface roughness of the roll is less than 30 $\mu$m, the number of the crystal nuclei generated is small, and as a result, the structure of the obtained alloy becomes two phase structure composed of crystal grains of $LaNi_5$ type structure and crystal grains of $Ce_2Ni_7$ type structure, and the $LaNi_5$ type single phase structure cannot usually be obtained. On the other hand, if the ten-point mean roughness (Rz) exceeds 150 $\mu$m, the solidified alloy flakes have poor peeling properties from the roll, and thus an alloy cannot substantially be produced.

The method for producing the hydrogen storage alloy of the present invention is not limited to the method of the present invention using the roll casting device. It is believed that the hydrogen storage alloy of the present invention may be obtained by cooling and uniformly solidifying an alloy melt having the above mentioned composition A into the particular uniform thickness under the aforementioned cooling conditions by using a rotary disk casting device or the like having the surface controlled to the similar surface roughness as mentioned above.

In the method of the present invention, the mixture of the starting metal materials may be melted, for example, by a vacuum melting method, a high frequency melting method, or the like method, preferably using a crucible in an inert gas atmosphere.

In the method of the present invention, the cooling at the supercooling degree and the cooling rate as mentioned above may be carried out by supplying, preferably continuously supplying the alloy melt onto a single roll or double rolls having the above surface roughness of a roll casting device, and cooling the alloy melt so that the thickness of the master alloy to be obtained is within the range from 0.1 to 2.0 mm. In this case, a grinder or the like for giving the above predetermined surface roughness to the roll surface may be disposed in contact with a desired portion of the roll surface of the roll casting device in order to maintain the roll surface at the constant surface roughness at all times with the rotation of the roll. In this way, the desired alloy can be obtained continuously, and thus being industrially advantageous.

In the method of the present invention, next the alloy obtained by uniformly solidifying the alloy melt to have the thickness of 0.1 to 2.0 mm under the above cooling conditions using the roll with the particular surface roughness is heated in vacuum or an inert atmosphere at 800 to 1000° C., preferably 850 to 950° C. for 0.1 to 12 hours, preferably 4 to 8 hours, to make the arrangement of the desired antiphase boundaries distinct and to relieve the lattice strains, thereby obtaining an alloy having an increased hydrogen storage capacity of the hydrogen storage alloy. In this step, the segregations of the element M in the formula (1) such as Co, Al, or Mn disappear to form a homogeneous structure, and thus the expansion and contraction of lattice upon hydrogen absorption and desorption (upon charging and discharging) become even to prevent cracking of the alloy. As a result, decrepitation is restrained, and an alloy which can improve the battery life when it is used for an anode for a nickel-hydrogen rechargeable battery can be obtained. This heating is preferably controlled within the range of ±10° C., and may be carried out in an ordinary heat treatment furnace. The alloy may be subjected to the heating as it is (in the form of ribbons) or after it is coarsely crushed or pulverized. The alloy after the heating may be made into hydrogen storage alloy powders through ordinary crushing and pulverizing steps.

According to this method, the hydrogen storage alloy B can be produced which includes in an amount of not less than 10 volume % and less than 95 volume % thereof crystals each containing not less than 2 and less than 20 antiphase boundaries, which are never contained in a conventional hydrogen storage alloy of the $LaNi_5$ type structure, extending perpendicular to C-axis of a crystal grain of the alloy per 20 nm along the C-axis, and in which not less than 60% and less than 95% of the added amount of the substitution element L in the formula (1) is arranged in the antiphase areas.

The anode for a nickel-hydrogen rechargeable battery of the present invention contains as an anode material the above hydrogen storage alloy B and an electrically conductive material.

The hydrogen storage alloy B is used preferably in the form of a pulverized material with 20 to 100 μm pulverized particle size, more preferably 40 to 50 μm uniform particle size. The pulverization may be carried out by coarsely crushing the hydrogen storage alloy B by a stamp mill or the like, and then mechanically pulverizing the obtained alloy particles by a planetary ball mill or the like device in a non-oxidizing solvent such as hexane. The content of the hydrogen storage alloy B is 70 to 95% by weight, preferably 80 to 90% by weight of the total weight of the anode material. If the content of the alloy B is less than 70% by weight, the hydrogen storage capacity of the anode to be obtained becomes low, and high capacity is hardly achieved, thus not being preferred. On the other hand, if the content of the alloy B exceeds 95% by weight, the electrical conductivity is decreased, and durability is impaired, thus not being preferred.

Examples of the electrically conductive material may include copper, nickel, cobalt, carbon, and the like. The electrically conductive material may be used in the form of powders with the particle size of about 1 to 10 μm. The content of the electrically conductive material is preferably 5 to 20% by weight, more preferably 10 to 20% by weight of the total weight of the anode material.

The anode for a nickel-hydrogen rechargeable battery of the present invention may contain a binder in addition to the above requisite components. Preferred examples of the binder may include an ethylene tetrafluoride-propylene hexafluoride copolymer (FEP), polytetrafluoroethylene, carboxymethyl cellulose, or the like. The content of the binder is preferably less than 10% by weight of the total weight of the anode material.

The anode for a nickel-hydrogen rechargeable battery of the present invention may be prepared, for example, by binding the anode material on a collector body of a conductive material such as nickel mesh, nickel or copper expanded metal, nickel or copper punched metal, foamed nickel, and woolen nickel. The binding may be carried out by a rolling press method, a molding press method, or the like into the form of preferably a sheet or a pellet. The obtained anode can be used in the same way as an anode for an ordinary nickel-hydrogen rechargeable battery to produce a rechargeable battery.

The hydrogen storage alloy B of the present invention can exhibit high initial activity, high electrical capacity, and long battery life all at the same time when it is used for an anode material for a nickel-hydrogen rechargeable battery. According to the present invention, such hydrogen storage alloy B can be obtained in a practical manner. Further, since the anode for a nickel-hydrogen rechargeable battery of the present invention exhibits high initial activity, high electrical capacity, and long battery life at the same time, it is expected to be demanded in place of a conventional anode.

EXAMPLES

The present invention will now be explained in more detail with reference to Examples and Comparative Examples, but the present invention is not limited thereto.

Example 1

A starting material was prepared so that the composition thereof was 8.3 parts by weight of La, 16.3 parts by weight of Ce, 1.7 parts by weight of Pr, 6.9 parts by weight of Nd, 0.75 parts by weight of Gd, 50.4 parts by weight of Ni, 1.3 parts by weight of Al, 7.6 parts by weight of Co, 6.5 parts by weight of Mn, and 0.3 parts by weight of Fe, and then melted in an argon atmosphere by a high frequency induction furnace to obtain an alloy melt. The obtained alloy melt was formed into alloy ribbons with the thickness of 0.3 to 0.4 mm under the conditions of the supercooling degree of 150° C. and the cooling rate of 2000 to 5000° C./sec. using a single roll casting device having a water-cooled copper roll with the surface roughness of 100 μm in the ten-point mean roughness (Rz). The obtained alloy was heated in an argon atmosphere at 950° C. for 4 hours. The results of the calculation of the composition of the obtained alloy into atomic ratio and the values of x, y, and z in the formula (1) are shown in Table 1.

Figure 2:
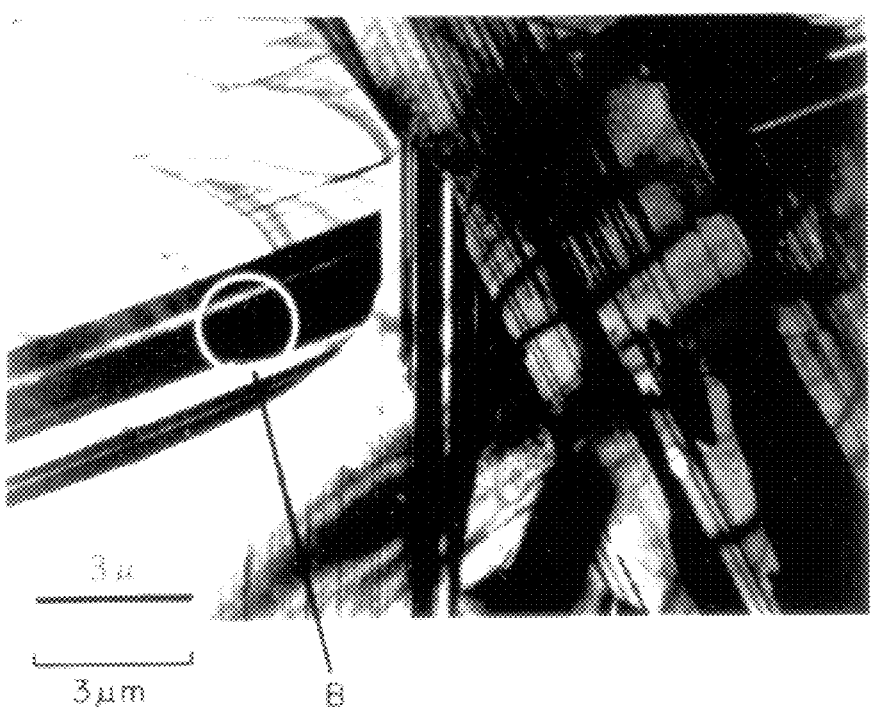
FIG. 2 is a photograph taken by a high-resolution transmission electron microscope for determining the content of the crystal grains containing the antiphase boundaries therein in the alloy in the form of ribbons prepared in Example 1.

Powders of the obtained alloy were determined of X-ray diffraction pattern by an X-ray diffraction apparatus manufactured by RIGAKU CORPORATION, thereby confirming that the alloy had $LaNi_5$ type single phase structure. The alloy was observed in the (100) plane of the crystal grain under a high-resolution transmission electron microscope (JEL4000EX) manufactured by JOEL LTD. to determine the number of the antiphase boundaries extending perpendicular to the C-axis of the crystal grain of the alloy per 20 nm along the C-axis, and the content of the crystal grains containing the antiphase boundaries included in the alloy. Further, the amount of Gd present in the antiphase area was determined by high-resolution EDX spectrometry. The results are shown in Table 2. Further, the photograph taken by the microscope used for determining the number of the antiphase boundaries extending perpendicular to the C-axis of the crystal gain per 20 nm is shown in FIG. 1, and the photograph taken by the microscope used for determining the content of the crystal grains containing the antiphase boundaries is shown in FIG. 2. In the photographs, A in FIG. 1 denotes the antiphase area, and B in FIG. 2 denotes the portion corresponding to FIG. 1 before enlargement.

Subsequently, the alloy was measured of the hydrogen storage capacity and the hydrogen storage pressure using an automated Sievert's-type PCT measuring apparatus manufactured by LESCA CO., LTD. according to JIS H7201 (1991) "Method for Measuring Pressure-Composition Diagram (PCT curve) of Hydrogen Storage Alloy". The results are shown in Table 2.

Next, the alloy was coarsely crushed in a stamp mill, and further pulverized by a planetary ball mill in a hexane solvent into powders of the average particle size of 80 μm. 10 g of the obtained alloy powders, 1 g of copper powders as an electrically conductive material, and 0.3 g of FEP powders (ethylene tetrafluoride-propylene hexafluoride copolymer) as a binder were mixed together to produce a pellet electrode with 20 mm diameter. The obtained electrode was immersed in a 6N KOH solution to produce a battery using a mercury oxide reference electrode, and the electrode characteristics were determined with a potentiogalvanostat (manufactured by HOKUTO DENKO CORPORATION). The results are shown in Table 2.

The initial activity and the battery life were measured on the basis of the point where the battery capacity reached the constant level after repeated charging and discharging. The battery life was determined by comparing the capacity at 100 cycles with the capacity at the constant level.

Examples 2 to 16

A hydrogen storage alloy was produced in the same way as in Example 1 except that the starting material was prepared to have the composition as shown in Table 1. The obtained alloy and a battery produced with this alloy were subjected to the same measurements as in Example 1. The results are shown in Table 2.

Comparative Example 1

An alloy in the form of ribbons was produced in the same way as in Example 1 from a starting material having the composition as shown in Table 1. The obtained alloy was charged in a heat treatment furnace, and heated under argon gas stream at 950° C. for 4 hours. The alloy and a battery produced with this alloy in the same way as in Example 1 were subjected to the same measurements as in Example 1. The results are shown in Table 2.

Comparative Example 2

A starting material having the composition as shown in Table 1 was melted in the same way as in Example 1 to give an alloy melt. In this composition, Gd as the substitution element L was contained in excess of the range defined by the present invention. Using the obtained alloy melt, an alloy in the form of ribbons was produced in the same way as in Example 1. The obtained alloy was heated under argon gas stream at 950° C. for 4 hours. The alloy and a battery produced with this alloy in the same way as in Example 1 were subjected to the same measurements as in Example 1. The results are shown in Table 2.

Comparative Example 3

An alloy in the form of ribbons was produced in the same way as in Example 1 except that the same alloy melt as in Example 3 was used, and the cooling rate was set at 300 to 600° C./sec., and the obtained alloy was heated in the same way as in Example 1, thereby obtaining a hydrogen storage alloy. The alloy and a battery produced with this alloy in the same way as in Example 1 were subjected to the same measurements as in Example 1. The results are shown in Table 2.

Comparative Example 4

An alloy was produced in the same way as in Example 1 except that the same alloy melt as in Example 3 was charged into a water-cooled copper mold while the temperature of the alloy melt was maintained at 1450° C. to obtain an alloy of 20 mm thick by a metal mold casting method. The obtained alloy and a battery produced with this alloy were subjected to the same measurements as in Example 1. The results are shown in Table 2.

Comparative Example 5

A hydrogen storage alloy was produced in the same way as in Example 1 except that the same alloy melt as in Example 3 was used, and a single roll casting device having a water-cooled copper roll with the surface roughness of 5 $\mu$m in the ten-point mean roughness (Rz) was used as the single roll casting device. The obtained alloy and a battery produced with this alloy were subjected to the same measurements as in Example 1. The results are shown in Table 2.

TABLE 1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Alloy | La | 0.25 | 0.24 | 0.23 | 0.23 | 0.23 | 0.23 | 0.23 | 0.23 | 0.23 | 0.23 | 0.23 |
| Composi- | Ce | 0.49 | 0.48 | 0.46 | 0.46 | 0.46 | 0.46 | 0.46 | 0.46 | 0.46 | 0.46 | 0.46 |
| tion | Pr | 0.05 | 0.05 | 0.05 | 0.05 | 0.05 | 0.05 | 0.05 | 0.05 | 0.05 | 0.05 | 0.05 |
| (Atomic | Nd | 0.20 | 0.19 | 0.18 | 0.18 | 0.18 | 0.18 | 0.18 | 0.18 | 0.18 | 0.18 | 0.18 |
| Ratio) | Gd | 0.20 | 0.04 | 0.08 | | | | | | | | 0.08 |
| | Dy | | | | 0.08 | | | | | | | |
| | Er | | | | | 0.08 | | | | | | |
| | Yb | | | | | | 0.08 | | | | | |
| | Y | | | | | | | 0.08 | | | | |
| | Sc | | | | | | | | 0.08 | | | |
| | Mg | | | | | | | | | 0.08 | | |
| | Ca | | | | | | | | | | 0.08 | |
| | Ni | 3.61 | 3.51 | 3.38 | 3.38 | 3.33 | 3.38 | 3.38 | 3.38 | 3.38 | 3.38 | 3.38 |
| | Al | 0.20 | 0.20 | 0.19 | 0.19 | 0.19 | 0.19 | 0.19 | 0.19 | 0.19 | 0.19 | 0.19 |
| | Co | 0.54 | 0.53 | 0.50 | 0.50 | 0.50 | 0.50 | 0.50 | 0.50 | 0.50 | 0.50 | 0.50 |
| | Mn | 0.50 | 0.49 | 0.47 | 0.47 | 0.47 | 0.47 | 0.47 | 0.47 | 0.47 | 0.47 | 0.47 |
| | Fe | 0.02 | 0.02 | 0.02 | 0.02 | 0.02 | 0.02 | 0.02 | 0.02 | 0.02 | 0.02 | 0.02 |
| | Ti | | | | | | | | | | | 0.02 |
| | Zr | | | | | | | | | | | |
| | B | | | | | | | | | | | |
| | Mb | | | | | | | | | | | |
| | W | | | | | | | | | | | |
| | Cu | | | | | | | | | | | |
| Value of x | | 0.02 | 0.04 | 0.08 | 0.08 | 0.08 | 0.08 | 0.08 | 0.08 | 0.08 | 0.08 | 0.08 |
| Value of y | | 0.26 | 0.26 | 0.26 | 0.26 | 0.26 | 0.26 | 0.26 | 0.26 | 0.26 | 0.26 | 0.26 |
| Value of z | | 4.87 | 4.75 | 4.56 | 4.56 | 4.56 | 4.56 | 4.56 | 4.56 | 4.56 | 4.56 | 4.56 |

| | | Example | | | | | Comparative Example | | | | |
|---|---|---|---|---|---|---|---|---|---|---|---|
| | | 12 | 13 | 14 | 15 | 16 | 1 | 2 | 3 | 4 | 5 |
| Alloy | La | 0.23 | 0.23 | 0.23 | 0.23 | 0.23 | 0.25 | 0.20 | 0.23 | 0.23 | 0.23 |
| Composi- | Ce | 0.46 | 0.46 | 0.46 | 0.46 | 0.46 | 0.50 | 0.40 | 0.46 | 0.46 | 0.46 |
| tion | Pr | 0.05 | 0.05 | 0.05 | 0.05 | 0.05 | 0.05 | 0.04 | 0.05 | 0.05 | 0.05 |
| (Atomic | Nd | 0.18 | 0.18 | 0.18 | 0.18 | 0.18 | 0.20 | 0.16 | 0.18 | 0.18 | 0.18 |
| Ratio) | Gd | 0.08 | 0.08 | 0.08 | 0.08 | 0.08 | | 0.20 | 0.08 | 0.08 | 0.08 |
| | Dy | | | | | | | | | | |
| | Er | | | | | | | | | | |

TABLE 1-continued

|  | | | | | | | | | | |
|---|---|---|---|---|---|---|---|---|---|---|
| Yb | | | | | | | | | | |
| Y | | | | | | | | | | |
| Sc | | | | | | | | | | |
| Mg | | | | | | | | | | |
| Ca | | | | | | | | | | |
| Ni | 3.38 | 3.38 | 3.38 | 3.38 | 3.38 | 3.38 | 3.38 | 3.38 | 3.38 | 3.38 |
| Al | 0.19 | 0.19 | 0.19 | 0.19 | 0.19 | 0.19 | 0.19 | 0.19 | 0.19 | 0.19 |
| Co | 0.50 | 0.50 | 0.50 | 0.50 | 0.50 | 0.50 | 0.50 | 0.50 | 0.50 | 0.50 |
| Mn | 0.47 | 0.47 | 0.47 | 0.47 | 0.47 | 0.47 | 0.47 | 0.47 | 0.47 | 0.47 |
| Fe | 0.02 | 0.02 | 0.02 | 0.02 | 0.02 | 0.02 | 0.02 | 0.02 | 0.02 | 0.02 |
| Ti | | | | | | | | | | |
| Zr | 0.02 | | | | | | | | | |
| B | | 0.02 | | | | | | | | |
| Mb | | | 0.02 | | | | | | | |
| W | | | | 0.02 | | | | | | |
| Cu | | | | | 0.02 | | | | | |
| Value of x | 0.08 | 0.08 | 0.08 | 0.08 | 0.08 | 0 | 0.20 | 0.08 | 0.08 | 0.08 |
| Value of y | 0.26 | 0.26 | 0.26 | 0.26 | 0.26 | 0.26 | 0.26 | 0.26 | 0.26 | 0.26 |
| Value of z | 4.56 | 4.56 | 4.56 | 4.56 | 4.56 | 4.56 | 4.56 | 4.56 | 4.56 | 4.56 |

TABLE 2

| | Antiphase Boundaries | | | PCT characteristics | | Battery Characteristics | | |
|---|---|---|---|---|---|---|---|---|
| | Number @ of Antiphase Boundaries Extending Perpendicular to C-Axis in Crystal Grain (Number/20 nm) | Content of Crystal Grains Satisfying $2 \leq @ < 20$ in Alloy (volume %) | Amount of Substitution Element L present in Antiphase Area (%) | Hydrogen Storage Capacity 30° C. (H/M) | Hydrogen Storage Pressure 30° C. (atm) | Battery Capacity (mAh/g) | Battery Life Rate of Maintained capacity at 100 cycle (%) | Initial Activity (Cycle) |
| Example 1 | 7–12 | 20 | 70 | 0.90 | 0.9 | 290 | 90 | 4 |
| Example 2 | 9–13 | 30 | 70 | 0.95 | 1.0 | 300 | 91 | 4 |
| Example 3 | 10–15 | 40 | 80 | 1.00 | 1.1 | 320 | 90 | 4 |
| Example 4 | 8–11 | 30 | 70 | 1.00 | 1.1 | 320 | 89 | 4 |
| Example 5 | 7–11 | 40 | 80 | 1.10 | 1.1 | 320 | 88 | 3 |
| Example 6 | 11–14 | 40 | 90 | 1.00 | 1.2 | 310 | 89 | 3 |
| Example 7 | 8–13 | 50 | 80 | 0.96 | 1.0 | 320 | 92 | 3 |
| Example 8 | 9–12 | 30 | 70 | 0.98 | 1.1 | 310 | 90 | 3 |
| Example 9 | 10–13 | 40 | 80 | 0.95 | 1.1 | 310 | 90 | 3 |
| Example 10 | 8–13 | 40 | 80 | 0.95 | 1.2 | 310 | 90 | 4 |
| Example 11 | 5–11 | 40 | 70 | 1.00 | 1.0 | 310 | 90 | 6 |
| Example 12 | 6–12 | 50 | 90 | 1.00 | 1.1 | 310 | 85 | 5 |
| Example 13 | 7–11 | 30 | 90 | 1.00 | 1.1 | 320 | 88 | 3 |
| Example 14 | 10–12 | 40 | 80 | 1.00 | 1.1 | 310 | 87 | 3 |
| Example 15 | 10–12 | 30 | 80 | 1.00 | 1.0 | 310 | 88 | 4 |
| Example 16 | 10–13 | 30 | 80 | 1.00 | 1.2 | 320 | 90 | 4 |
| Comp. Ex. 1 | 10–13 | 30 | 0 | 1.00 | 0.8 | 270 | 90 | 5 |
| Comp. Ex. 2 | 9–12 | 30 | 80 | 0.80 | 1.5 | 250 | 75 | 5 |
| Comp. Ex. 3 | 7–10 | 5 | 40 | 0.80 | 2.0 | 250 | 65 | 5 |
| Comp. Ex. 4 | 0 | 0 | 0 | 0.70 | 3.0 | 180 | 50 | 7 |
| Comp. Ex. 5 | 5–10 | 7 | 50 | 0.85 | 1.3 | 270 | 90 | 5 |

What is claimed is:

1. A rare earth metal-nickel hydrogen storage alloy consisting essentially of the formula (1)

$$(R_{1-x}L_x)(Ni_{1-y}M_y)_z \quad (1)$$

wherein R stands for La, Ce, Pr, Nd, or mixtures thereof, L stands for Gd, Tb, Dy, Ho, Er, Tm, Yb, Lu, Y, Sc, Mg, Ca, or mixtures thereof, M stands for Co, Al, Mn, Fe, Cu, Zr, Ti, Mo, Si, V, Cr, Nb, Hf, Ta, W, B, C, or mixtures thereof, x, y and z satisfy the formulae of $0.01 \leq x \leq 0.1$, $0 \leq y \leq 0.5$, and $4.5 \leq z \leq 5.0$, respectively, crystals in said alloy consisting of a LaNi$_5$ type single phase structure, said alloy including in an amount of not less than 10 volume % and less than 95 volume % thereof crystals each containing not less than 2 and less than 20 antiphase boundaries extending perpendicular to C-axis of a crystal grain of the alloy per 20 nm along the C-axis, not less than 60% and less than 95% of added amount of said element represented by L in the formula (1) being arranged in antiphase areas.

2. The rare earth metal-nickel hydrogen storage alloy of claim 1 wherein x in the formula (1) is within the range of $0.05 \leq x \leq 0.09$.

3. The method for producing the rare earth metal-nickel hydrogen storage alloy of claim 1 comprising the steps of uniformly solidifying an alloy melt consisting essentially of a composition represented by the formula (1)

$$(R_{1-x}L_x)(Ni_{1-y}M_y)_z \quad (1)$$

wherein R stands for La, Ce, Pr, Nd, or mixtures thereof, L stands for Gd, Tb, Dy, Ho, Er, Tm, Yb, Lu, Y, Sc, Mg, Ca, or mixtures thereof, M stands for Co, Al, Mn, Fe, Cu, Zr, Ti, Mo, Si, V, Cr, Nb, Hf, Ta, W, B, C, or mixtures thereof, x, y and z satisfy the formulae of $0.01 \leq x \, 0.1$, $0 \leq y \leq 0.5$, and $4.5 \leq z \leq 5.0$, respectively, to have a thickness of 0.1 to 2.0 mm under cooling conditions wherein a supercooling degree is 50 to 500° C. and a cooling rate is 1000 to 10000° C./sec. using a roll casting device having a roll with a surface roughness of 30 to 150 μm in ten-point mean roughness (Rz), thereby obtaining an alloy; and heating said alloy in vacuum or an inert atmosphere at 800 to 1000° C. for 0.1 to 12 hours.

4. The method of claim 3 wherein said roll has a surface roughness of 60 to 120 μm in ten-point mean roughness (Rz).

5. The method of claim 3 wherein said heating step is carried out at 850 to 950° C.

6. An anode for a nickel-hydrogen rechargeable battery containing as an anode material the rare earth metal-nickel hydrogen storage alloy of claim 1 and an electrically conductive material.

7. The anode for a nickel-hydrogen rechargeable battery of claim 6 wherein a particle size of said rare earth metal-nickel hydrogen storage alloy is 20 to 100 μm, and a particle size of said electrically conductive material is 1 to 10 μm.

8. The anode for a nickel-hydrogen rechargeable batter of claim 6 wherein a content of said rare earth metal-nickel hydrogen storage alloy is 70 to 95% by weight of the total weight of the anode material, and a content of said electrically conductive material is 5 to 20% by weight of the total weight of the anode material.

9. The anode for a nickel-hydrogen rechargeable battery of claim 6 wherein said anode material further contain a binder.

* * * * *